US006024201A

United States Patent [19]

Husse et al.

[11] Patent Number: 6,024,201

[45] Date of Patent: Feb. 15, 2000

[54] DISENGAGING MECHANISM FOR A FRICTION CLUTCH

[75] Inventors: Ulrich Husse, Schweinfurt; Kurt Lindner, Niederwerrn; Karl Müller, Kronungen; Reiner Voss, Maibach, all of Germany

[73] Assignee: Fichtel & Sachs AG, Schweinfurt, Germany

[21] Appl. No.: 08/821,772

[22] Filed: Mar. 20, 1997

[30] Foreign Application Priority Data

Mar. 21, 1996 [DE] Germany ........................... 196 11 185
Jan. 14, 1997 [DE] Germany ........................... 197 00 930

[51] Int. Cl.[7] ........................................ F16D 23/14

[52] U.S. Cl. .................................... 192/99 S; 192/109 R

[58] Field of Search ............................... 192/995, 109 R, 192/91 R, 98, 89.24

[56] References Cited

U.S. PATENT DOCUMENTS

| | | | |
|---|---|---|---|
| 4,086,996 | 5/1978 | Gatewood . | |
| 4,186,828 | 2/1980 | Renaud . | |
| 4,648,500 | 3/1987 | Parzefall . | |
| 4,773,516 | 9/1988 | Parzefall | 192/30 V |
| 4,821,858 | 4/1989 | Kabayama | 192/91 R |
| 4,832,166 | 5/1989 | Parzefall | 192/98 |
| 5,009,300 | 4/1991 | Romig | 192/98 |
| 5,012,911 | 5/1991 | Kabayama | 192/89.24 |
| 5,785,164 | 7/1998 | Hanique et al. | 192/99 S |

FOREIGN PATENT DOCUMENTS

| | | |
|---|---|---|
| 23 04 826 | 10/1976 | France . |
| 23 13 597 | 12/1976 | France . |
| 2577291 | 8/1986 | France . |
| 2322247 | 1/1974 | Germany . |
| 28 30 249 | 1/1979 | Germany . |
| 38 10 369 | 10/1989 | Germany . |
| 41 18 360 | 12/1991 | Germany . |
| 43 28 463 | 3/1994 | Germany . |
| 2046395 | 11/1980 | United Kingdom . |
| 2 219 059 | 11/1989 | United Kingdom . |

*Primary Examiner*—Charles A. Marmor
*Assistant Examiner*—Saul J. Rodriguez
*Attorney, Agent, or Firm*—Cohen, Pontani, Lieberman & Pavane

[57] ABSTRACT

A disengaging mechanism for a friction clutch which is arranged in a motor vehicle between an internal combustion engine and a transmission flanged to the internal combustion engine by a casing. The disengaging mechanism includes a guide pipe which is fastenable in the casing. A release bearing element is guided radially at the outer circumference of the guide pipe so as to be axially movable. The disengaging mechanism also includes a clutch lever which is to be articulated at the casing for transmitting clutch actuating forces. At least the guide pipe and the clutch lever are held together to form a constructional unit prior to installation in the motor vehicle. In the operation-ready state, the movement limiting components influence the movability of the disengaging mechanism. Assembly is facilitated by constructing the disengaging mechanism as a constructional unit, which can also contain the release bearing element.

21 Claims, 6 Drawing Sheets

FIG. 7
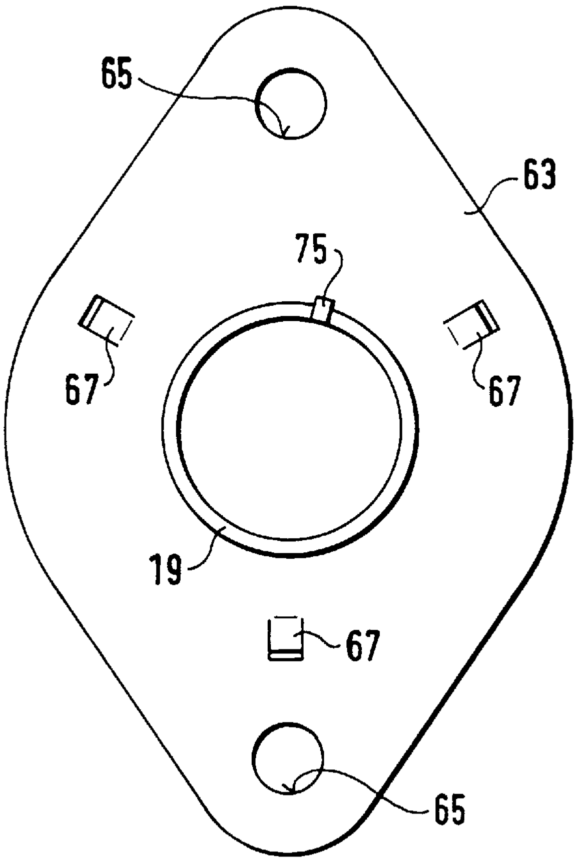
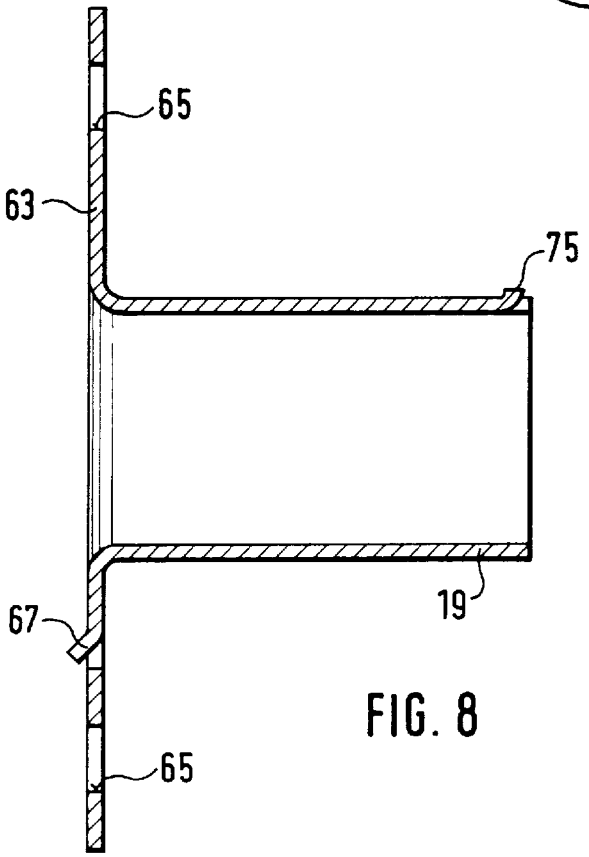
FIG. 8

DISENGAGING MECHANISM FOR A FRICTION CLUTCH

BACKGROUND OF THE INVENTION

1. Field of the Invention

The invention is directed to a disengaging mechanism for a friction clutch which is arranged in a motor vehicle between an internal combustion engine and a transmission flanged to the internal combustion engine by a casing and is rotatable about an axis. The disengaging mechanism comprises a release bearing element. A guide pipe is fastenable in the casing coaxially to the axis of rotation and penetrates the release bearing element axially. The release bearing element is guided radially at the guide pipe so as to be axially movable. The disengaging mechanism also includes a clutch lever for transmitting clutch actuating forces to the release bearing element. The clutch lever is swivelably fastened to the casing via a joint.

The invention is further directed to a disengaging mechanism for a friction clutch which is arranged in a motor vehicle between an internal combustion engine and a transmission flanged to the internal combustion engine by the casing and is rotatable about an axis. The disengaging mechanism comprises a guide pipe which is fastenable in the casing coaxially to the axis of rotation. A release bearing element is guided radially at the outer circumference of the guide pipe so as to be axially movable. The disengaging mechanism also includes a clutch lever for transmitting clutch actuating forces to the release bearing element. The clutch lever is swivelably fastened to the casing via a joint.

2. Description of the Prior Art

German reference DE-OS 23 22 247 discloses a self-centering release bearing which is held in frictional contact at a clutch lever so as to be displaceable radially by means of a plurality of spring clamps. The spring clamps also fix a guide sleeve which slides on a guide pipe between the release bearing and the clutch lever.

British reference GB-2 046 359 A discloses a release bearing whose guide sleeve can be snapped onto a release lever when installed in the vehicle by means of locking pins which are formed integral with the guide sleeve.

French reference FR-2 577 291 discloses a self-centering release bearing arrangement in which the release bearing, the guide pipe and a pressing disk can be preassembled by means of a clamping ring. The pressing disk is contacted during operation by a clutch fork that is separately mounted.

U.S. Pat. No. 4,648,500 discloses a mechanism of the type mentioned above in which a release bearing arrangement, a clutch lever and a guide sleeve are components that are prepared separately from one another and are first joined upon installation in the vehicle.

In previous solutions, the individual components or component groups of the disengaging mechanism were assembled only during the course of installing the transmission at the engine. This made warehousing of parts and assembly more difficult. In the event of a faulty positioning of the individual parts relative to one another, the transmission had to be separated from the engine again in order to undo the defect.

In order to compensate for axial play in the individual component parts of the disengaging mechanism in the operation-ready state, it is conventional to provide a preloading spring which pretensions the clutch lever relative to the friction clutch. The preloading spring is commonly integrated in the hydraulic slave cylinder of the disengaging mechanism which is to be mounted subsequently. It has also been attempted to install the preloading spring between the clutch lever and the casing. However, this requires separate means for securing the assembly during installation, which means would have to be introduced from the outside through an opening in the casing. After assembly, the opening would have had to be resealed by means of a rubber cap.

SUMMARY OF THE INVENTION

It is an object of the present invention to provide a disengaging mechanism of the type mentioned above which is easier to assemble and, in particular, dispenses with additional means for securing the assembly.

Pursuant to this object, and others which will become apparent hereafter, one aspect of the present invention resides in a disengaging mechanism in which at least the release bearing element, the guide pipe and the clutch lever form a constructional unit prior to installation in the motor vehicle. At least the guide pipe, the release bearing element and the clutch lever being nondetachably connected with one another. The constructional unit is arranged at the intended location immediately prior to fitting the casing onto the internal combustion engine.

In another embodiment of the disengaging mechanism, at least the guide pipe and the clutch lever, prior to installation in the motor vehicle, form a constructional unit in which at least the guide pipe and the clutch lever are nondetachably connected with one another.

The individual parts of the disengaging mechanism are already complete and preferably pre-positioned in their installation positions relative to one another so that the installation of the disengaging mechanism can be effected quickly and without errors even in large volume production.

In particular, movement limiting means are provided at the guide pipe on the one hand and at the release bearing element and/or clutch lever on the other hand so as to be coordinated with one another and hold at least the guide pipe, the release bearing element and the clutch lever together nondetachably before the guide pipe and clutch lever are fastened to the casing. The movement limiting means of the guide pipe are arranged so that, after the casing has been fastened to the internal combustion engine, they are at a distance axially from the movement limiting means of the release bearing element and/or of the clutch lever. This distance is greater than the axial stroke of the respective movement limiting means of the release bearing element and/or of the clutch lever occurring during clutch actuation. The movement limiting means can interact in a positive engagement with stops or springs or can also act via frictional engagement. The stops can be bent after the constructional unit has been assembled or they can be formed as springing locking devices or as disposable elements which are destroyed when the constructional unit is disassembled. In the operation-ready state, the movement limiting means are disengaged and thus not in use, but may remain in place.

The constructional unit can be assembled in an especially fast and secure manner in that the guide pipe is positioned at a predetermined angular position relative to the clutch lever and/or the release bearing element before the constructional unit is installed in the motor vehicle.

For this purpose, the guide pipe can be positioned in any one of a number of predetermined angular positions relative to the clutch lever and/or the release bearing element prior to installing the constructional unit in the motor vehicle. It is accordingly possible with constructional units of the same type to prepare different configurations of clutch-release installation units which are equally suitable for different applications and installation conditions. An essential feature of the present invention is that the angular position of the structural components within the constructional unit is already fixed and need no longer be taken into account when installing the disengaging mechanism during assembly of the engine and transmission.

The movement limiting means includes a protuberance which projects radially outward from the end of the guide pipe near the clutch and engages behind the release bearing element. At least one depression or recess is provided in the release bearing element to hold the protuberance and accordingly the guide pipe in a predetermined angular position relative to the release bearing element. A kind of bayonet catch or quarter-turn fastener for coupling the components is achieved in this way.

In this regard, the release bearing element can have at its inner circumference at least one longitudinal groove which extends continuously in the axial direction so as to be offset at an angle around the axis of rotation relative to the recess. The protuberance can move through this longitudinal groove during assembly of the guide pipe and release bearing element. The clutch lever is preferably nondetachably secured to the guide pipe in that the guide pipe penetrates an opening in the clutch lever and has, at its end remote of the clutch, a flange holding the clutch lever between itself and the release bearing element so as to limit movement.

For purposes of the nondetachable preassembly of the release bearing element and the clutch lever, the release bearing element can penetrate an opening in the clutch lever so as to be displaceable in the longitudinal direction of the clutch lever and can be nondetachably fixed, especially locked, relative to the clutch lever so as to be swivelable at the clutch lever in the direction of the axis of rotation about an orthogonal line relative to the longitudinal direction of the clutch lever and to the axis of rotation.

To enable installation of the disengaging mechanism without additional means for securing the assembly at the casing prior to assembly of the transmission and engine also when using a preloading spring which is integrated in the constructional unit, the preloading spring, which can be a conical helical spring in particular, is preferably arranged in the constructional unit between the flange of the guide pipe and the clutch lever. Accordingly, after installation, the preloading spring presses the clutch lever and thereby the release bearing element against the friction clutch without play. The preloading spring is accordingly a component part of the constructional unit of the disengaging mechanism. The movement limiting means prevent the preloading spring from pushing the constructional unit apart and allowing it to fall apart.

To eliminate the need for providing, positioning and arranging additional fastening parts when fitting the disengaging mechanism to the casing, the flange of the guide pipe can contain at least one bore hole in which a fastening bolt, in particular a screw bolt, is loosely inserted for fastening the constructional unit to the casing. The clutch lever can contain another bore hole which is aligned with the first bore hole and whose diameter allows a fastening tool, in particular a screw-tightening tool, to be inserted, but prevents the bolt from falling out of the bore hole of the fastening flange. The fastening bolt is accordingly also a component part of the constructional unit. Due to the predetermined fixing of the rotational angle of the clutch lever relative to the guide pipe and thereby relative to the fastening flange, it is necessary only to insert the fastening tool, e.g., a hex wrench, through the bore hole of the clutch lever. The tool is positively guided through the bore hole to the fastening bolt. Having once aligned the clutch lever in the casing, the fastening bolt is located directly in its bolt receptacle in the casing. To facilitate precise axial assembly of the guide pipe at the casing, the flange can have, at its side remote of the clutch, centering elements which center it at the casing relative to the axis of rotation.

To further facilitate assembly, joint elements of the joint can be nondetachably connected with the clutch lever so as to form a component part of the constructional unit.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

FIG. 7 shows a guide pipe for the support illustrated in FIG. 4, viewed in the direction of the casing;

FIG. 8 shows the guide pipe illustrated in FIG. 7, in section;

DETAILED DESCRIPTION OF THE PREFERRED EMBODIMENTS

Figure 1:
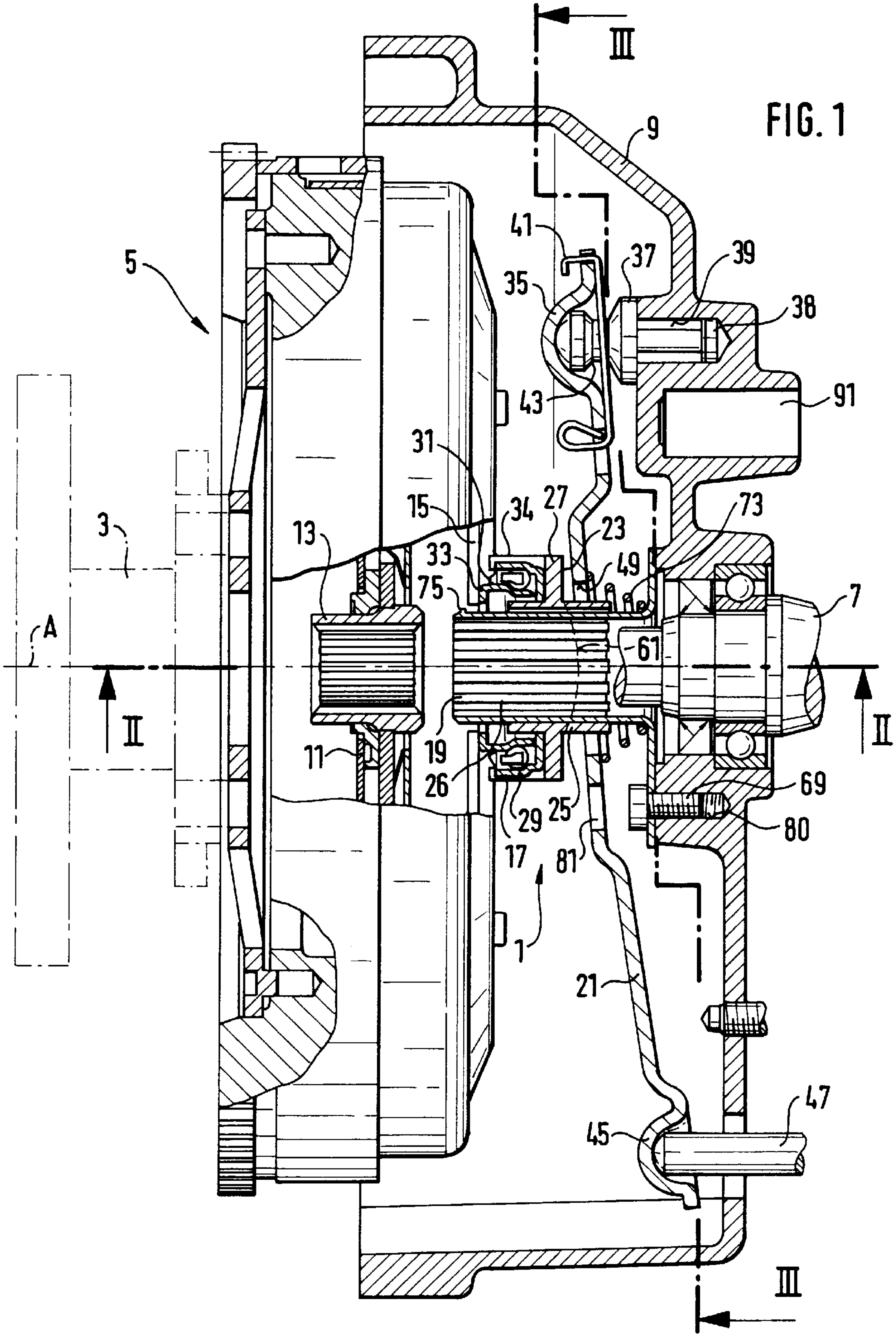
FIG. 1 is an axial longitudinal section through a disengaging mechanism at a friction clutch in a motor vehicle showing an axis or axle.
Figure 2:
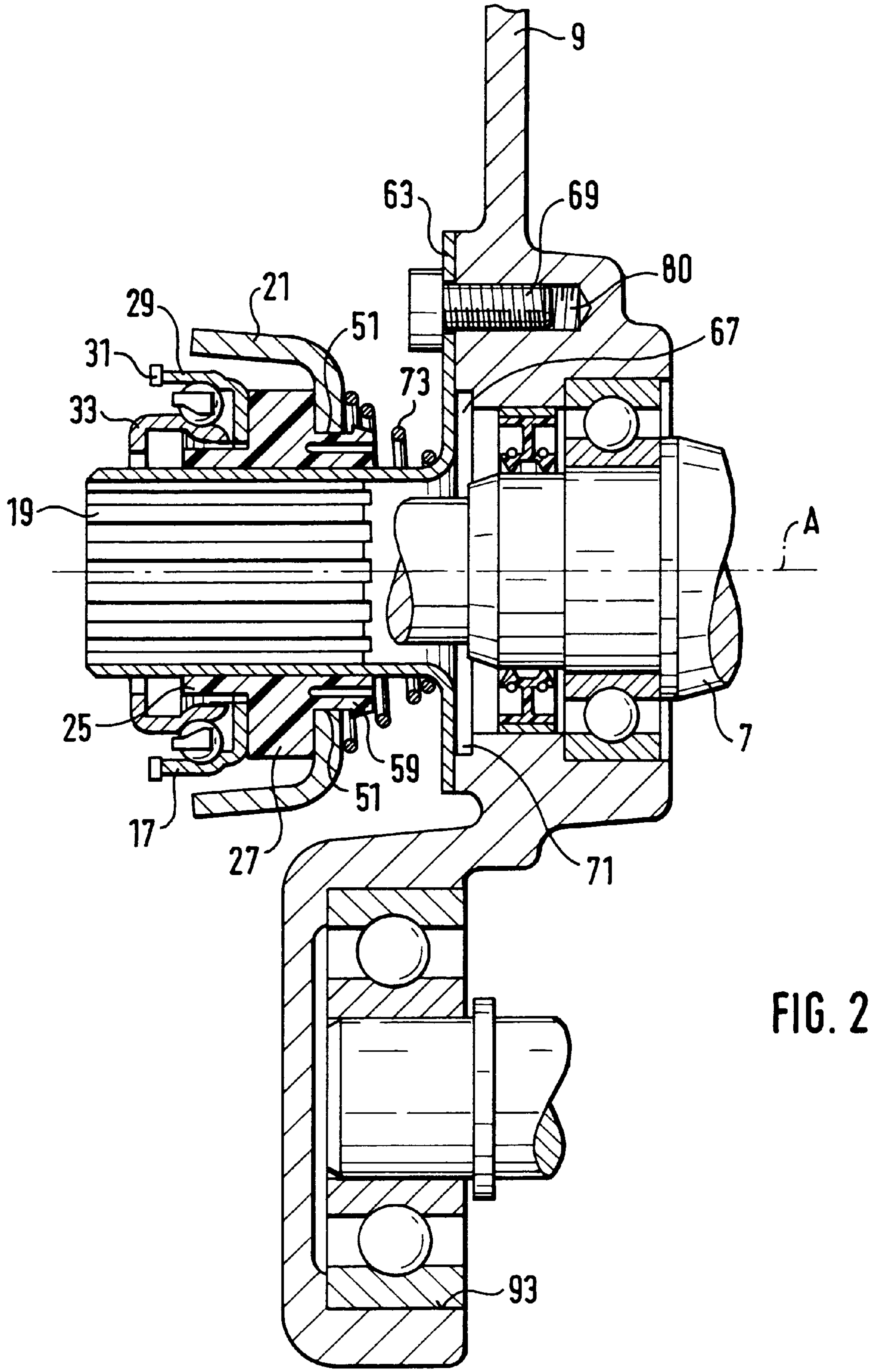
FIG. 2 is a section of the disengaging mechanism illustrated in FIG. 1 along the line II—II.

FIG. 1 shows a partial sectional axial longitudinal view through a disengaging mechanism 1 for a friction clutch 5 arranged at the end of a crankshaft 3 of an internal combustion engine for transmitting torque from the crankshaft 3 to an input shaft 7 of a transmission arranged downstream of the internal combustion engine. The crankshaft 3, clutch 5 and input shaft 7 are arranged in this order one behind the other coaxially along a common axis of rotation A—A. The transmission is flanged on at the internal combustion engine by a casing 9 formed on the transmission housing. The disengaging mechanism 1 is arranged axially between the clutch 5 and the casing 9.

The clutch 5 has a clutch disk 11 which is provided, as is conventional, with friction facings and has a hollow hub 13 which is attached, via splines, to the end of the transmission input shaft 7 so as to be fixed with respect to rotation but axially displaceable relative to the input shaft 7. The clutch disk 11 is clamped axially between a pressure plate and counterpressure plate on the crankshaft side by a diaphragm spring 15. The clutch can be disengaged by pressing axially on the diaphragm spring 15 in the direction of the crankshaft 3 by means of the disengaging mechanism 1. It will be understood that the disengaging mechanism 1 can also be applied in other types of clutches such as those using springs other than diaphragm springs.

The disengaging mechanism 1 comprises a release bearing element 17 for contacting end faces of spring tongues of the diaphragm spring 15 remote of the crankshaft. The disengaging mechanism 1 also comprises a guide pipe 19 which can be fastened in the casing 9 coaxially to the axis of rotation A—A. The guide pipe 19 encloses the transmission input shaft 7 without contacting it. The release bearing element 17 is guided radially on the outer circumference of the guide pipe 19 so as to be movable axially in a sliding manner. The disengaging mechanism 1 also comprises a clutch lever 21 which is to be articulated at the casing 9 at a distance from the axis A—A for the introduction of clutch actuation forces to the release bearing element 17.

The release bearing element 17 comprises a bearing support 23 which can be made of plastic and has a sleeve portion 25 guiding the release bearing element 17 on the guide pipe 19, and a flange portion 27 that projects radially from the longitudinal center of the sleeve portion 25. The sleeve portion 25 has, at its inner side, longitudinal ribs 26 which permit a smooth displacement of the sleeve portion 25 on the guide pipe 19. A slightly displaceable, nonrotatable bearing race 29 of a release bearing 31, in the form of a ball bearing, for example, is supported radially at the crankshaft side of the flange portion 27 to compensate for tolerances. A rotatable bearing race 33 of the release bearing 31 contacts the surface of the diaphragm spring 15 remote of the crankshaft. The release bearing 31 is nondetachably fastened to the flange portion 27 of the bearing support 23 by spring clamps 34 distributed along its circumference. The release bearing element 17 is not limited to the embodiment illustrated in the drawing.

The clutch lever 21, which is a one-armed clutch lever in the present instance, is arranged radially relative to the axis A—A and has a U-shaped cross section opening toward the crankshaft side. At one end, the clutch lever 21 has a joint socket 35 which opens toward the transmission side and in which is inserted a ball head 37. A fastening pin 38 is inserted in an associated bore hole 39 of the casing 9 and projects away from the ball head 37. A form spring 41 is nondetachably fitted to the clutch lever 21 radially at both sides of the joint socket 35 and secures the ball head 37 on the clutch lever 21 in that its parallel legs engage in opposite sides of an undercut 43 of the ball head 37. The spring 41 is designed so that it automatically snaps into the undercut 43 when the joint socket 35 is placed on the ball head 37.

At its other end, the clutch lever 21 has another joint socket 45 which opens toward the transmission side. A release actuating element 47, e.g., a plunger 47 of a slave cylinder (not shown) of a hydraulic clutch actuating device, engages in the joint socket 45. Alternatively, this can also be an actuating element of an electrically actuated clutch actuation device.

Figure 3:
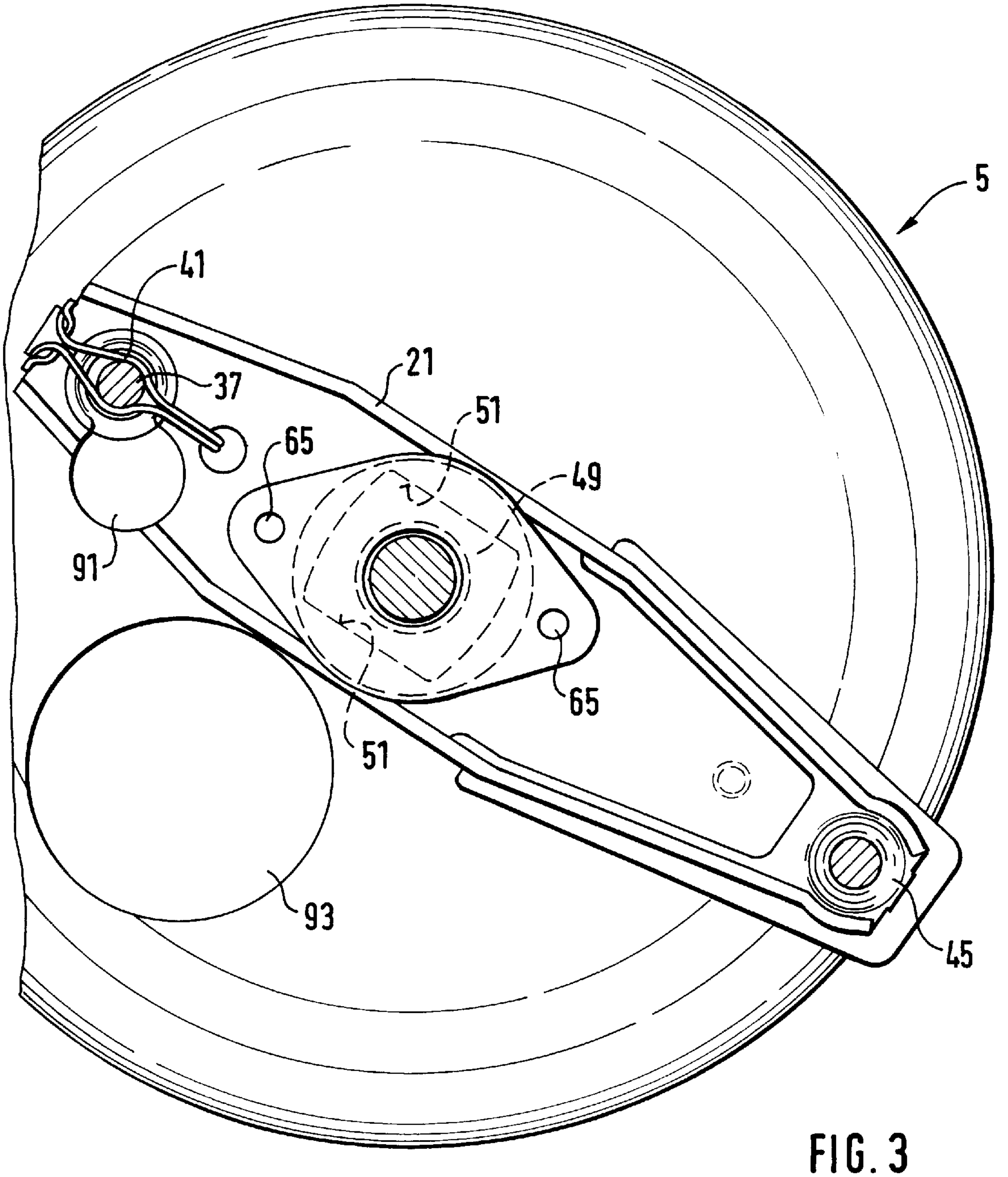
FIG. 3 is a view of the disengaging mechanism illustrated in FIG. 1 in the direction of the casing from the plane III—III.
Figure 4:
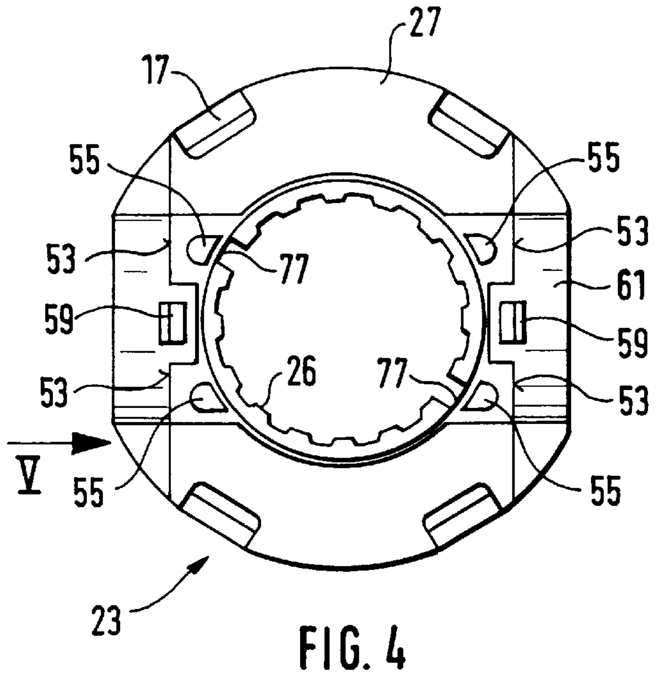
FIG. 4 shows a support for a release bearing viewed in the direction of the casing and in the direction of the arrow IV in FIG. 5.
Figure 5:
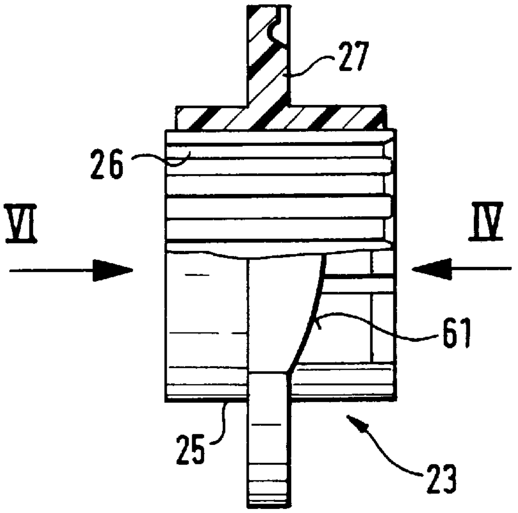
FIG. 5 shows the support illustrated in FIG. 4, in the direction of arrow V.
Figure 6:
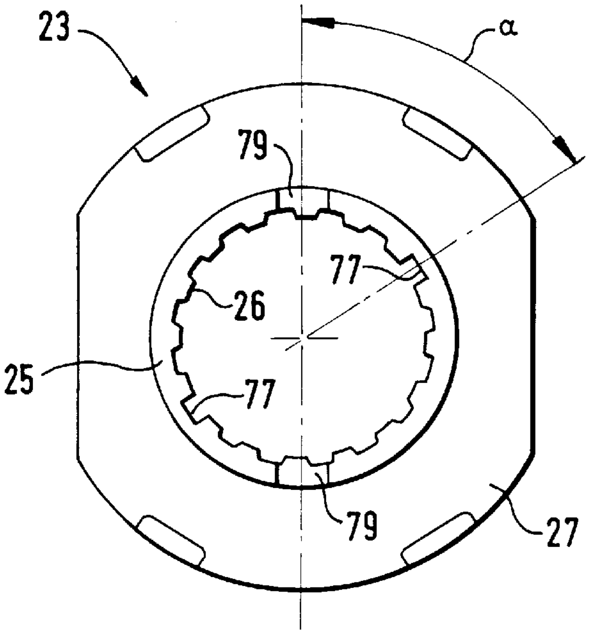
FIG. 6 shows the support illustrated in FIG. 4 in the direction of arrow VI in FIG. 5.

The clutch lever 21 contains, in its longitudinal central area, an elongated hole 49 that extends in its longitudinal direction for receiving the sleeve portion 25 of the bearing support 23 for the release bearing 31 and for receiving the guide pipe 19. Pairs of tangential guide surfaces 53 of axial projections 55 of the flange portion 27 of the bearing support 23 contact parallel longitudinal edges 51, 51 of the elongated hole 49 (FIG. 3). These pairs of tangential guide surfaces 53 guide the release bearing element 17 in the longitudinal direction of the clutch lever 21 in a displaceable manner to absorb tolerances and relative movements occurring during clutch actuation. Locking protuberances 59 are located between pairs of projections 55 of the bearing support 23 which are associated with each longitudinal edge 51, 51. The locking protuberances 59 are formed integral with the bearing support 23, project outward radially and penetrate the elongated hole 49 and secure the bearing support 23 and the release bearing element 17 fastened thereto with axial play to the release lever 21 in the axial direction A—A in a nondetachable manner.

Radially outside of the guide surfaces 55 of the shoulders 57, the flange portion 27 of the bearing support 23 has convex bulges 61 on both sides in the region of the axis A—A, which bulges 61 project in the axial direction A—A toward the transmission side. The release bearing element 17 for transmitting clutch release forces is supported at the surface of the clutch lever 21 on the crankshaft side by means of these bulges 61. The release bearing element 31 is swivelable about a line extending substantially orthogonally to the axis A—A and to the longitudinal axis of the clutch lever 21 by means of these bulges 61, so that it is movable linearly on the guide pipe 19 in the axial direction A—A during the swiveling movement of the clutch lever 21 about the center of rotation 35, 37 without stresses.

The guide pipe 19, which is made of metal in the present case, carries at its end on the transmission side a fastening flange 63 with two diametrically opposite holes 65, 65. By means of screw bolts 69 penetrating the holes 65, 65, the guide pipe 19 is fastened to an end face of the casing 9 extending normal to the axis. The flange 63 also has centering shoulders 67 distributed around the circumference and projecting toward the transmission for centering the guide pipe 19 relative to the axis A—A at an annular recess 71 of the casing 9. The fastening flange 63, acting as movement limiting means, prevents the clutch lever 21 and the release bearing element 17 from slipping off the guide pipe 19 toward the transmission side before the disengaging mechanism 1 is installed.

A conical preloading helical spring 73 is tensioned between a surface 21' of the clutch lever 21 remote of the clutch and the fastening flange 63 so as to contact the clutch lever 21 by its large diameter and the fastening flange 63 by its small diameter. The helical spring 73 holds the disengaging mechanism 1 between the actuating device 47 and the diaphragm spring 15 without play in the installed state. This preloading spring 73 replaces the preloading spring previously used in the slave cylinder.

The other end of the guide pipe 19 located on the crankshaft side projects at a distance over the attached release bearing element 17 and carries a radially projecting protuberance 75. The protuberance acts as another movement limiting means and prevents the release bearing element 17 from slipping over this end of the guide pipe 19 before the disengaging mechanism 1 has been installed.

Prior to mounting at the internal combustion engine, the guide pipe 19, possibly including screw bolts 69 inserted in its flange holes 65, the clutch lever 21 with the form spring 41, possibly the release bearing element 17 including the bearing support 23 and release bearing 31, and the preloading spring 73 form a preassembled constructional unit. This constructional unit is assembled in the following manner:

1. The form spring 41 is snapped into the clutch lever 21.

2. The preloading spring 73 is pushed over the guide pipe 19 until it contacts the flange 63. Further, the screw bolts 69 can be inserted into the flange holes 65 in this state.
3. The release bearing element 17, which is already inserted in the elongated hole 49 of the clutch lever 21 and locked therein by means of the locking protuberances 59, is then pushed over the guide pipe 19 proceeding from the crankshaft side. When the release bearing element 17 is slipped over the guide pipe 19, the protuberance 75 of the guide pipe 19 slides through one of two diametrically opposite longitudinal grooves 77 at the inner circumference of the sleeve portion 25 of the bearing support 23.
4. When the protuberance 75 emerges from the end of the bearing support 23 on the crankshaft side, the bearing support 23 rotates relative to the guide pipe 19 about the axis A—A by a predetermined angle α in the manner of a quarter-turn fastening, so that the protuberance 75 comes to rest in front of an axial recess 79 in the crankshaft-side collar end of the sleeve portion 25 of the bearing support 23.
5. The protuberance 75 is pressed into the recess 79 by the preloading spring 73 as soon as these parts are released. The release bearing element 17 accordingly assumes a predetermined, angular position which is rigid against rotation relative to the guide pipe 19.

Since the clutch lever 21 is also guided via its elongated hole 49 at the guide surfaces 53 of the release bearing element 23 so as to be fixed with respect to relative rotation, the clutch lever 21 is now also positioned at a predetermined angular position relative to the guide pipe 19. The clutch lever 21 prevents the screw bolts 69 from falling out of the holes 65 of the flange portion 63. Alternatively, the protuberance 75 can be bent only after the assembly of the constructional unit 1; otherwise, a locking device, possibly a disposable locking device, can be provided in place of the quarter-turn fastening. This constructional unit is now delivered to the assembly location for the internal combustion engine and transmission as a ready-to-install pre-positioned unit.

At the assembly location, the fastening pin 38 of the ball head 37 is inserted into the respective bore hole 39 of the casing 9 and the ball head 37 is preassembled on the casing. The clutch lever 21 is then placed on the ball head 37 by its joint socket 35 until both legs of the form spring 41 which is ready-mounted at the clutch lever 21 snap into the undercut 43 of the ball head 37. Of course, the ball head can also be delivered as a component part of the preassembled constructional unit.

The screw bolts 69 are already located in their predetermined angular position in front of their respective threaded holes 80 in the casing 9 owing to the action of the protuberance 75 in the recess 79, and need only be screwed tight through openings 81 in the clutch lever 21. The openings 81 are dimensioned so that the screw bolts 69 cannot fall out though them prior to assembly, but a screw-tightening tool, preferably a hex wrench, can be inserted therein for tightening the screw bolts 69.

The transmission with the disengaging mechanism 1 fastened thereto as a constructional unit can then be flanged to the internal combustion engine. When the release bearing 31 contacts the diaphragm spring 15, the spring 15 presses the release bearing element 17 and the clutch lever 21 against the spring 73 toward the transmission so that the joint socket 45 contacts the actuating element 47 without play. The protuberance 75 moves out of the recess 79 in the axial direction A—A until the axial distance of the protuberance 75 to the release bearing element 17 is always greater than the axial stroke of the release bearing element 17 occurring during actuation of the clutch and in the course of wear on the clutch.

If the protuberance 75 is guided through the other longitudinal groove 77 of the sleeve portion 25 of the release bearing element 17 during assembly of the guide pipe 19 and the release bearing element 17. The release lever 21 is preassembled in a 180-degree rotated position so that a different configuration can be preassembled with the identical parts as a constructional unit for different installation conditions. Of course, other angular positions of the longitudinal grooves 77 relative to one another are also possible and it is also possible to provide a greater number of such longitudinal grooves 77 than the two longitudinal grooves 77 shown in the drawing. A protuberance can also be formed at the release bearing element and a corresponding longitudinal groove can be formed at the guide pipe.

Figure 9:
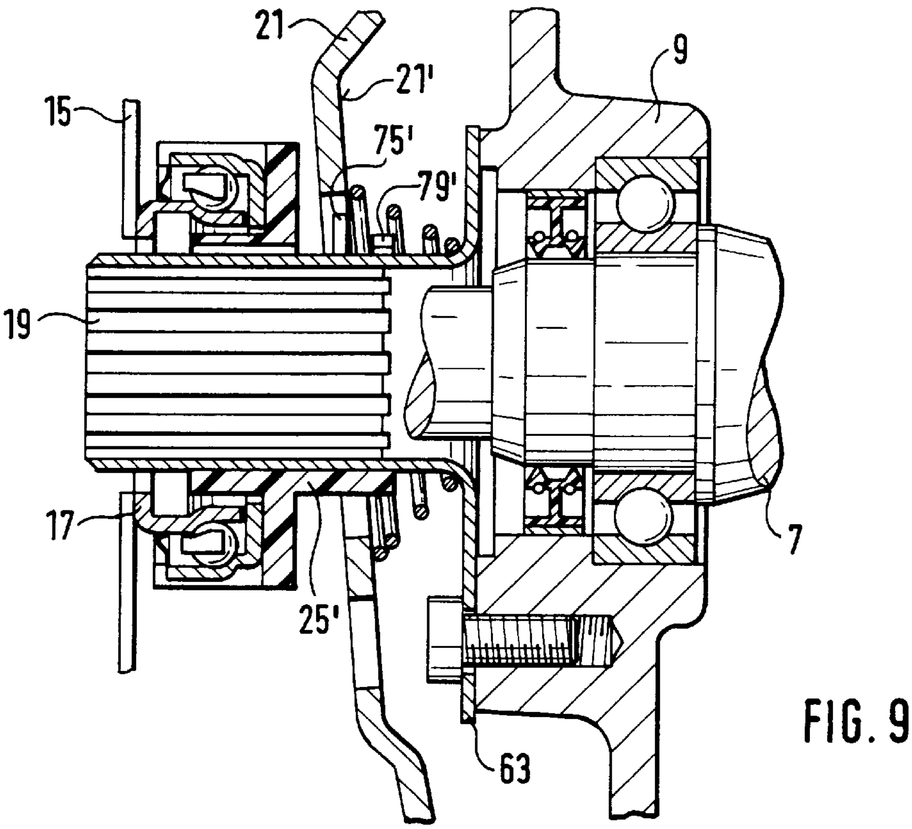
FIG. 9 is a partial view similar to FIG. 1 of another embodiment of the invention.

Alternatively, as illustrated in FIG. 9, a pin 75' can also project from the guide pipe 19 at another location such as at the transmission side of the release bearing element 17. The pin 75' is displaceable in an axially extending elongated hole 79' in the sleeve portion 25'. Of course, the release bearing element 17 can also have a pin which engages in an elongated hole of the guide pipe.

Figure 10:
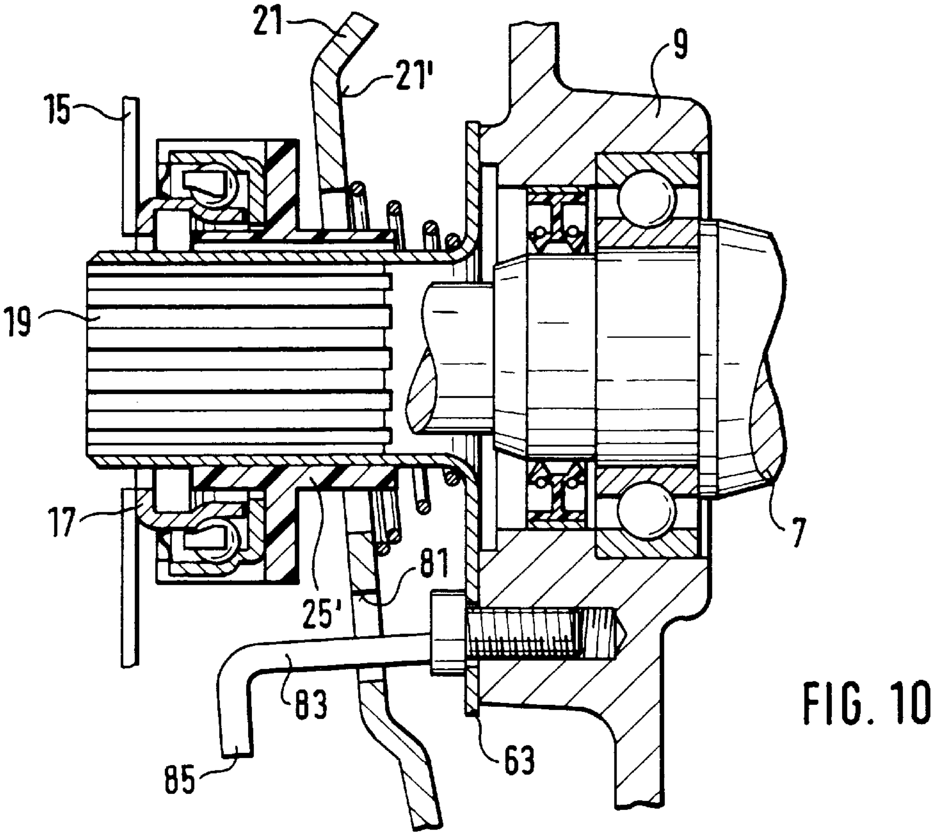
FIG. 10 is a view similar to FIG. 9 of yet a further embodiment of the invention.

Alternatively, as illustrated in FIG. 10, a continuation 83 can also project from the fastening flange 63 possibly so as to pass through a hole, e.g., hole 81, of the clutch lever 21 and secure the clutch lever 21 nondetachably to the guide pipe 19 by means of a terminating hook 85. In this embodiment, the constructional unit does not include the release bearing element 17, which can be fitted after mounting the constructional unit in the casing 9. But the release bearing element 17 can also be fastened to the clutch lever 21 by means of the locking protuberances 59 so that a nondetachably preassembled constructional unit including the release bearing element 17, the clutch lever 21 and the guide pipe 19 can also be achieved in this embodiment.

Frictionally engaging movement limiting devices can also be used instead of the positive-locking movement limiting devices mentioned above.

Also, a two-armed clutch lever can be used instead of the one-armed clutch lever 21 mentioned above.

In addition to the receiving bore hole 38 for the ball head 37, the casing 9 contains a bearing 91 for a gearshift rod and a bearing 93 for a secondary shaft of the transmission.

The invention is not limited by the embodiments described above which are presented as examples only but can be modified in various ways within the scope of protection defined by the appended patent claims.

We claim:

1. A disengaging mechanism for a friction clutch which is arranged in a motor vehicle between an internal combustion engine and a transmission flanged to the internal combustion engine by a casing and is rotatable about an axis, the disengaging mechanism comprising: a release bearing element; a guide pipe which is fastenable in the casing coaxially to the axis of rotation so as to penetrate the release bearing element axially, the release bearing element being guided radially at the guide pipe so as to be axially movable; a clutch lever operative for transmitting clutch actuating forces to the release bearing element; joint means for swivelably fastening the clutch lever to the casing, at least the release bearing element, the guide pipe and the clutch lever being nondetachably connected together to form a constructional unit prior to installation in the motor vehicle; and movement limiting means nondetachably provided at the guide pipe, and movement limiting means nondetachably provided at at least one of the release bearing element and at the clutch lever so as to be coordinated with one another, for holding at least the guide pipe, the release bearing element and the clutch lever together nondetachably before the guide pipe and clutch lever are fastened to the casing, the movement limiting means of the guide pipe being arranged so that, after the casing has been fastened to the internal combustion engine, the movement limiting means are at a distance axially from the movement limiting means of the release bearing element and the clutch lever, the distance being greater than an axial stroke of the corresponding movement limiting means of the release bearing element and the clutch lever occurring during clutch actuation.

2. A disengaging mechanism according to claim 1, wherein the guide pipe is positioned at a predetermined angular position relative to at least one of the clutch lever and the release bearing element, before the constructional unit is installed in the motor vehicle.

3. A disengaging mechanism according to claim 1, wherein the guide pipe is configured to be positionable in any one of a number of predetermined angular positions relative to at least one of the clutch lever and the release bearing element prior to installation of the constructional unit in the motor vehicle.

4. A disengaging mechanism according to claim 1, wherein the release bearing element is positioned at a predetermined angular position ($\alpha$) relative to the guide pipe, and the clutch lever is positioned at a predetermined angular position at the release bearing element.

5. A disengaging mechanism according to claim 1, wherein the movement limiting means include a stop element mounted on the guide pipe and an associated counter-stop element mounted on at least one of the release bearing element and the clutch lever, so that the stop element and the counter-stop element are one of axially opposite one another and contact one another before the constructional unit is in an installed state in the motor vehicle, and do not contact one another in the installed operation-ready state.

6. A disengaging mechanism according to claim 1, wherein the movement limiting means include a protuberance that projects radially outward from an end of the guide pipe near the clutch and engages behind the release bearing element, and at least one recess provided in the release bearing element so as to hold the protuberance and accordingly the guide pipe in a predetermined angular position ($\alpha$) relative to the release bearing element.

7. A disengaging mechanism according to claim 6, wherein the release bearing element has at an inner circumference in which at least one longitudinal groove extends continuously in the axial direction so as to be offset at an angle to the axis, the protuberance being configured to be movable through the longitudinal groove during assembly of the guide pipe and the release bearing element.

8. A disengaging mechanism according to claim 1, wherein the movement limiting means of the guide pipe and the release bearing element includes an elongated hole/projection combination configured to limit movement of the guide pipe and the release bearing element in the axial direction, the guide pipe and the release bearing element being positioned so as to be substantially fixed with respect to rotation relative to one another about the axis.

9. A disengaging mechanism according to claim 1, wherein the clutch lever has an opening therein, the guide pipe being arranged to penetrate the opening in the clutch lever, and further comprising a flange mounted at an end of the guide pipe remote of the clutch so as to hold the clutch lever between the flange and the release bearing element to limit movement.

10. A disengaging mechanism according to claim 1, wherein the movement limiting means comprise an extension member that projects from the guide pipe and engages behind a surface of the clutch lever remote of the clutch so as to define a movement of the clutch lever toward the friction clutch.

11. A disengaging mechanism according to claim 1, wherein the clutch lever has an opening therein, the release bearing element being arranged to penetrate the opening of the clutch lever so as to be displaceable in a longitudinal direction of the clutch lever, the release bearing element being nondetachably fixed to the clutch lever so as to be swivelable at the clutch lever in a direction of the axis of rotation about a line orthogonal to the longitudinal direction of the clutch lever and to the axis of rotation.

12. A disengaging mechanism according to claim 1, wherein the joint means are nondetachably connected to the clutch lever.

13. A disengaging mechanism for a friction clutch which is arranged in a motor vehicle between an internal combustion engine and a transmission flanged to the internal combustion engine by a casing and is rotatable about an axis, the disengaging mechanism comprising: a release bearing element; a guide pipe which is fastenable in the casing coaxially to the axis of rotation so as to penetrate the release bearing element axially, the release bearing element being guided radially at the guide pipe so as to be axially movable; a clutch lever operative for transmitting clutch actuating forces to the release bearing element; joint means for swivelably fastening the clutch lever to the casing, at least the release bearing element, the guide pipe and the clutch lever being nondetachably connected together to form a constructional unit prior to installation in the motor vehicle, the clutch lever having an opening therein, the guide pipe being arranged to penetrate the opening in the clutch lever; a flange mounted at an end of the guide pipe remote of the clutch so as to hold the clutch lever between the flange and the release bearing element to limit movement; and a preloading spring arranged between the flange of the guide pipe and the clutch lever so as to press the clutch lever and thereby the release bearing element against the friction clutch without play and press the clutch lever without play against an actuating element transmitting clutch releasing forces.

14. A disengaging mechanism according to claim 13, wherein the preloading spring is a conical helical spring.

15. A disengaging mechanism according to claim 13, wherein the flange of the guide pipe contains at least one bore hole, and further comprising a fastening bolt inserted in the bore hole for fastening the constructional unit to the casing, the clutch lever having another bore hole aligned with the bore hole of the flange, the another bore hole having a diameter that allows a fastening tool to be inserted but prevents the bolt from falling out of the bore hole of the fastening flange.

16. A disengaging mechanism according to claim 13, wherein the flange has centering elements provided at a side of the flange remote of the clutch so as to center the flange at the casing relative to the axis of rotation.

17. A disengaging mechanism according to claim 1, wherein the guide pipe is positioned at a predetermined angular position ($\alpha$) relative to the clutch lever before the constructional unit is installed in the motor vehicle.

18. A disengaging mechanism according to claim 1, wherein the guide pipe is configured to be positionable in any one of a number of predetermined angular positions relative to the clutch lever prior to installing the constructional unit in the motor vehicle.

19. A disengaging mechanism according to claim 1, wherein the movement limiting means includes a stop element mounted on the guide pipe and an associated counter-stop element mounted on the clutch lever so that the stop element and the counter-stop element are one of located axially opposite one another and contact one another before the constructional unit is in an installed state in the motor vehicle, and do not contact one another in the installed operation-ready state.

20. A disengaging mechanism according to claim 1, wherein the clutch lever has an opening therein, the guide pipe being arranged to penetrate the opening in the clutch lever, and further comprising a flange mounted at an end of the guide pipe remote of the clutch so as to hold the clutch lever between the flange and a counter-stop fixed in the constructional unit relative to the guide pipe, so as to limit movement.

21. A disengaging mechanism according to claim 1, wherein the release bearing element is nondetachably connected in the constructional unit with the guide pipe and the clutch lever.

* * * * *